United States Patent [19]

Legris et al.

[11] Patent Number: 4,658,849

[45] Date of Patent: Apr. 21, 1987

[54] PNEUMATIC SENSORS FOR THE CONTROL OF PNEUMATIC CYCLES

[75] Inventors: André Legris, Rennes; Yves Levenez, Vaux Le Penil, both of France

[73] Assignee: Societe anonyme dite Legris, Rennes Cedex, France

[21] Appl. No.: 746,654

[22] PCT Filed: Dec. 4, 1984

[86] PCT No.: PCT/FR84/00284

§ 371 Date: Jun. 13, 1985

§ 102(e) Date: Jun. 13, 1985

[87] PCT Pub. No.: WO85/02659

PCT Pub. Date: Jun. 20, 1985

[30] Foreign Application Priority Data

Dec. 9, 1983 [FR] France ................................ 83 19798

[51] Int. Cl.[4] ............................................ G05D 16/00

[52] U.S. Cl. ........................................................ 137/82

[58] Field of Search ............................. 137/82, 84, 85

[56] References Cited

U.S. PATENT DOCUMENTS 3,378,022 4/1968 Sorenson .

3,699,991 10/1972 Munch ................................ 137/82

3,812,873 5/1974 Laakaniemi ....................... 137/82 X

FOREIGN PATENT DOCUMENTS 1516690 1/1968 France .

547958 4/1974 Switzerland .

1428887 3/1976 United Kingdom .

OTHER PUBLICATIONS

Fluidtechnik Journal, vol. 8, No. 2, pp. 76, 77.

*Primary Examiner*—Alan Cohan

*Attorney, Agent, or Firm*—Shenier & O'Connor

[57] ABSTRACT

Improvement in pneumatic sensors for the control of pneumatic cycles, in which a liquid jet vacuum pump is supplied at the input by a compressed air circuit and connected at the output to a nozzle of which the obturation provokes a rise in pressure in the vacuum pump used as signal for controlling a pneumatic component. The space 4 comprised between the jets 2, 3 of the vacuum pump is connected on the one hand to an output orifice 14 emitting the control signal and on the other hand to an airing valve 13*b* which, open during the ejection leakage, admits the atmospheric pressure in the space 4, the output 14 and the duct 15 preventing the creation of a depression and which is closed during obturation of the leakage. The invention is used for the control of pneumatic cycles.

12 Claims, 19 Drawing Figures

Fig. 1
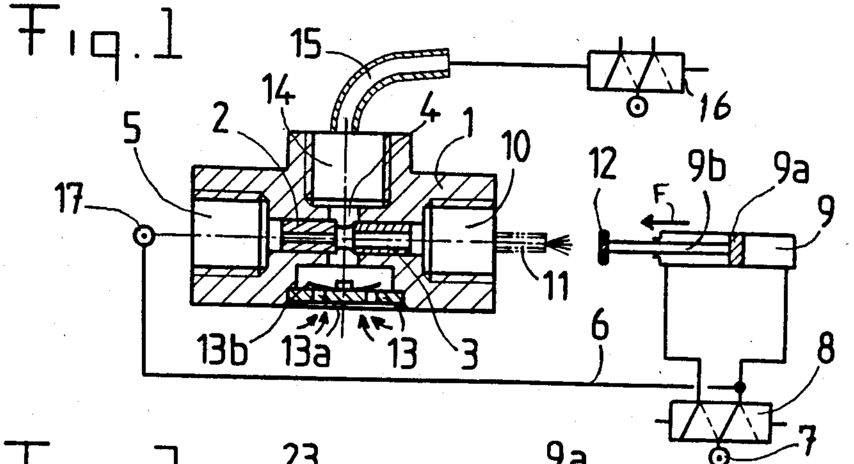
Fig. 2
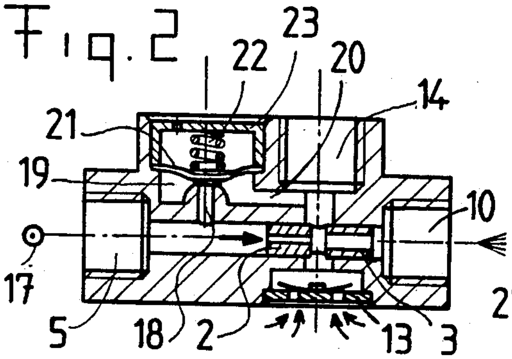
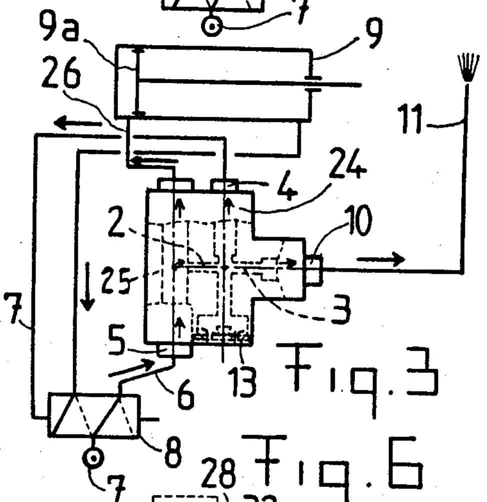
Fig. 3
Fig. 4
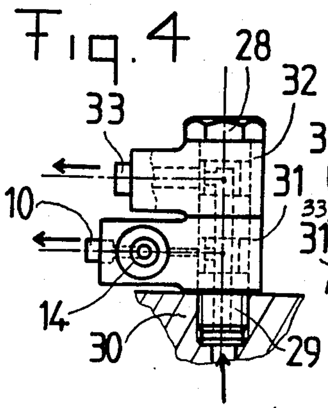
Fig. 5
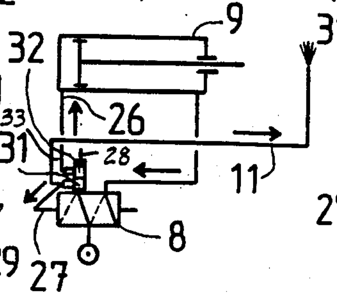
Fig. 6
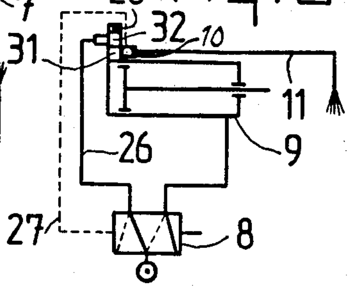
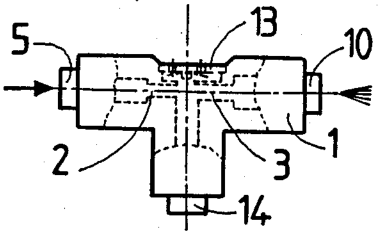
Fig. 7
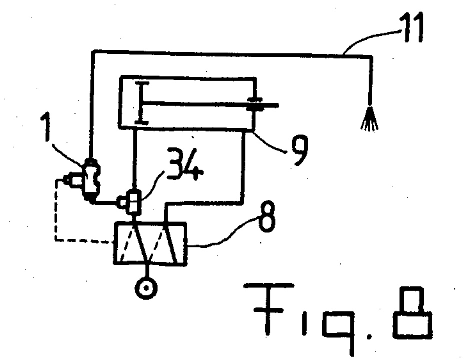
Fig. 8

Fig. 9
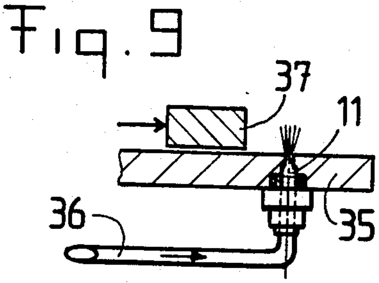
Fig. 10
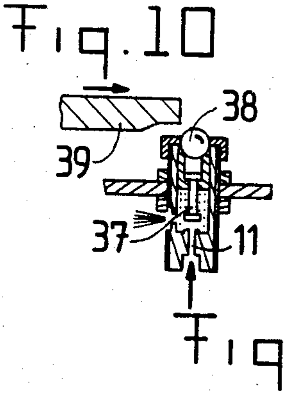
Fig. 10a
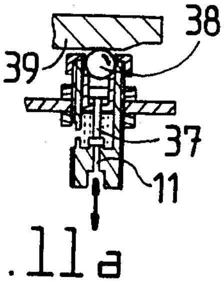
Fig. 11
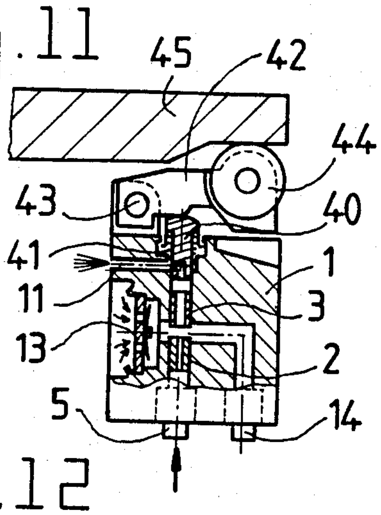
Fig. 11a
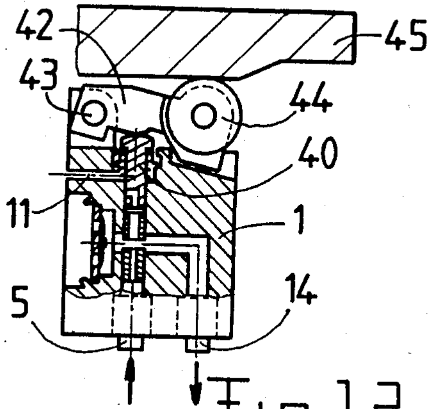
Fig. 12
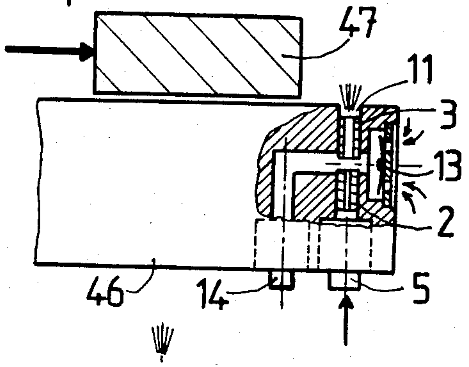
Fig. 12a
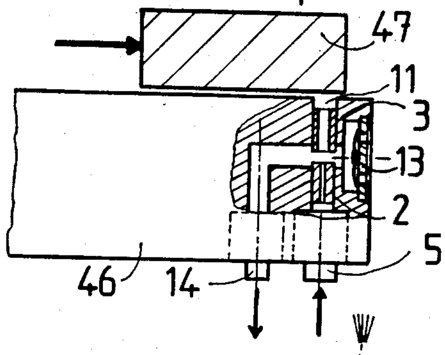
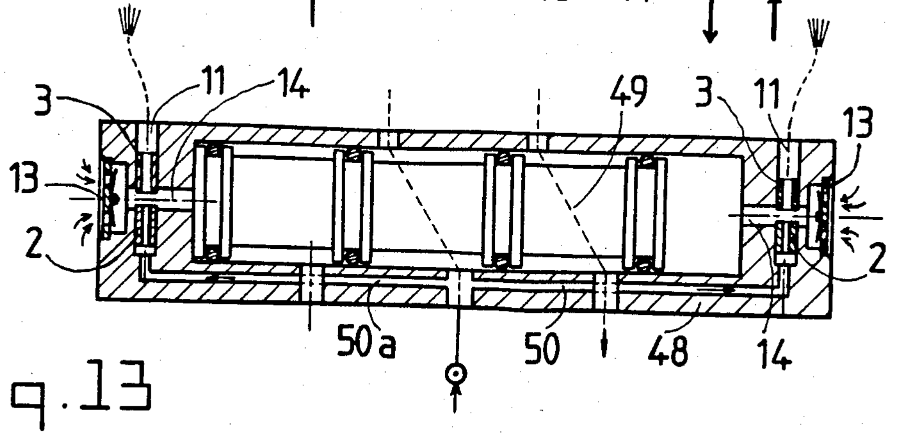
Fig. 13

PNEUMATIC SENSORS FOR THE CONTROL OF PNEUMATIC CYCLES

The present invention relates to an improvement in pneumatic sensors for the control of pneumatic cycles.

Pneumatic sensors, forming the subject matter in particular of British Pat. No. 1 428 887, are known, in which a liquid jet vacuum pump is used, supplied at the input by a compressed air circuit and connected at the output to a nozzle of which obturation provokes a rise in pressure in the vacuum pump which is transmitted to a pneumatic relay capable of transmitting a pneumatic signal. However, the pneumatic relay is very complex and comprises an assembly of diaphragms and valves.

In order to overcome this drawback, a much simplified device giving very good results is used according to the invention.

According to the invention, the space comprised between the jets of the vacuum pump is connected on the one hand to an output orifice emitting the control signal and on the other hand to an airing valve which, open during the ejection leakage, admits the atmospheric pressure in the space, the output and the duct preventing the creation of a depression and which is closed during obturation of the leakage, the supply pressure delivering and being established in the output, the duct thus forming the pneumatic pressure signal.

The device according to the invention therefore makes it possible to replace a relay or a "yes" cell by a valve annulling the depression of the vacuum pump and thus allowing, in simple manner, the use of a vacuum pump for the emission of control signal of a pneumatic component.

The device presents considerable simplicity as it allows the use of unions instead of complex apparatus with diaphragms, seats and multiple valves.

The rise in pressure and the signal are obtained by the obturation of the leakage circuit which may be a simple orifice but also leakage contactors of all types.

The leakage circuit may be integrated in the end-of-stroke switch apparatus employing signal but it may also be controlled electrically or pneumatically.

The signal emitted by the sensor may actuate by remote control all conventional distributor apparatus of all types.

The pneumatic signal emitted may be integrated in the apparatus and it may be converted into an electrical signal.

Finally, the device allows a rapidity of decontrol by limited aspiration.

Other characteristics and advantages of the invention will be more readily understood on reading the following description of several embodiments and with reference to the accompanying drawings, in which:

FIG. 1 is a view in section of a pneumatic sensor according to the invention connected to a pneumatic circuit comprising a jack and its distributor and also another distributor.

FIG. 2 is a view in section of a variant embodiment of a pneumatic sensor according to the invention.

FIG. 3 is a view of a pneumatic circuit comprising a sensor in the form of a union.

FIG. 4 is a view in elevation of a sensor in the form of a banjo union.

FIGS. 5 and 6 are views of a pneumatic circuit provided with the sensor shown in FIG. 4.

FIG. 7 is a view in elevation of a sesnor in the form of a T-union.

FIG. 8 is a view of a pneumatic circuit provided with the sensor shown in FIG. 7.

FIG. 9 is a view in section of an embodiment of the leakage nozzle.

FIGS. 10 and **10*a*** are views in section of a leakage nozzle comprising a valve and a ball control.

FIGS. 11 and **11*a*** are views in section of a sensor comprising a means for obturating the leakage nozzle provided with a control roller.

FIGS. 12 and **12*a*** are views in section of a sensor integrated in an apparatus with a leakage nozzle and an obturator.

FIG. 13 is a view in section of a distributor provided with integrated pneumatic sensors.

Figure 14:
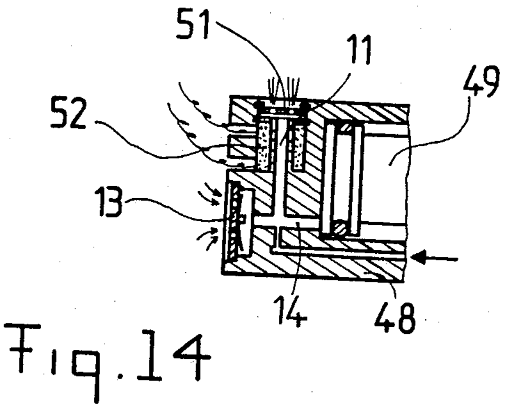

FIG. 14 is a view in section of a distributor comprising an integrated sensor controlling obturation of the leakage by an electrical means.

Figure 15:
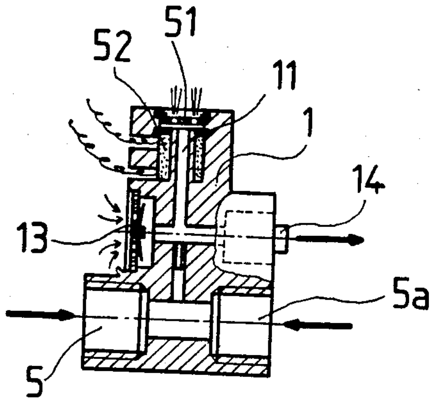

FIG. 15 is a view in section of a sensor in the form of a union controlling obturation of the leakage by an electrical means.

Figure 16:
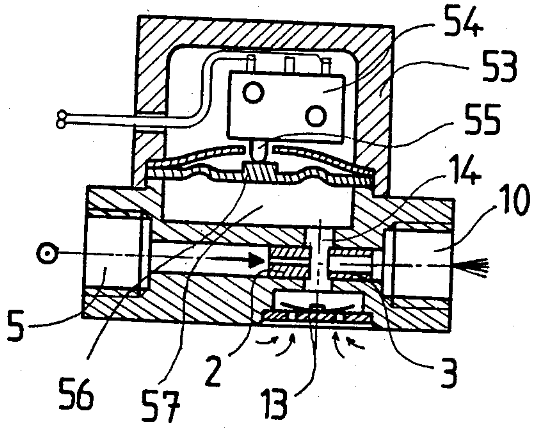

FIG. 16 is a view in section of a sensor comprising an electrical output signal.

FIG. 1 shows an embodiment of a pneumatic sensor according to the invention which comprises a body 1 presenting the form of a union and internally comprising a liquid jet vacuum pump constituted by a jet 2 of small diameter and a jet 3 of diameter larger than jet 2, a space 4 being provided between the two jets.

Jet 2 opens into a threaded pipe 5 which is connected by a duct 6 to a source of pressurized fluid 7 or to the fluid escaping from the jack via a distributor & supplying a jack 9 comprising a piston **9*a***.

Jet 3 opens into a threaded pipe 10 which is connected by a duct to a leakage nozzle 11 from which escapes a jet of air and which may be obturated by an obturation member 12 mounted at the end of the rod **9*b* of the jack 9. The space 4 located between the jets of the vacuum pump is connected on the one hand to a valve seat 13 presenting orifices 13*a* capable of being obturated by a thin elastic washer 13*b* forming a one-way valve and it opens out on the other hand into a threaded pipe 14 for output of a control signal itself connected by a duct 15 to a member to be controlled, particularly a distributor 16**.

The sensor functions in the following manner:

When the duct 6 is connected to the source of pressurizd fluid 7 and the obturator member 12 is in the position shown in FIG. 1, the fluid escapes through jet 11 towards the atmosphere and the vacuum pump 2, 3 functions normally, ensuring opening of the valve 13 which is connected to the atmosphere, the depression of the vacuum pump can therefore not be created, the duct 15 therefore remains substantially at atmospheric pressure and no action of pressure or depression acts by duct 15, therefore no pneumatic signal acts on the distributor 16 which remains stable. In fact, it is necessary to avoid "sucking" the slides of distributors, the latter having only to be pushed by a pressure signal. This is well effected by the invention thanks to the airing valve **13*b***.

The piston **9*a* moving in the direction of arrow F when it arrives at the end of stroke, the obturator member 12 obturates the nozzle 11 so that the fluid pressure delivers and increases in the space 4 of the vacuum pump and the valve 13*b* closes. The pressure propagates in the duct 15, giving a pressure signal which controls the distributor 16** of which the slide changes position.

During the rod return stroke of the jack 9, (in the direction opposite arrow F), the vacuum pump 2, 3 is again supplied by the air escaping from the jack towards the atmosphere; the vacuum pump accelerates decontrol of the distributor 16 until the pressure is equal to atmospheric pressure, valve 13*b* automatically being on the atmosphere at the least depression. Decontrol is therefore much more rapid than by a natural emptying. The circuit 15 returns very rapidly substantially to atmospheric pressure.

The same would apply in the case of a permanent supply at input 17, the diagram shown making it possible to limit the duration of the leakage to the sole duration of the supply of the jack and thus to limit consumption of leakage air.

FIG. 2 shows a variant embodiment of a sensor in which a means for amplifying the signal allows the simultaneous and rapid control of several distributors. This signal amplification means comprises a channel 18 in connection on one side with the supply input pipe 5 and on the other side with a chamber 19 connected by a channel 20 to the pipe 14 of the output signal.

The orifice of channel 18 is obturated by the central part of a diaphragm 21 or a piston subjected to the action of a spring 22 in abutment against a valve body 23. Upon obturation of the leakage nozzle 11 of the fluid, the pressure in the sensor, acting on the whole of the diaphragm 21, opens the channel 18 releasing a considerable quantity of fluid coming from the compressed air input towards the control output 14 through the chamber 19 and the channel 20 which is connected thereto.

FIG. 3 shows a sensor in the form of a union in which the body 24 which comprises a conduit for passage 25 of which the input 5 is connected to the source of pressurized fluid 7 by the distributor 8, said conduit 25 being connected to the vacuum pump 2, 3 and presenting a pressurized fluid output which is connected by a duct 26 to one of the chambers of the jack 9. The pipe 4 emitting the control signal is connected by a duct 27 to the input of the control means of the jack 8.

FIG. 4 shows a sensor which is constituted by a banjo union 31 and a screw 28 mounted directly in a tapped hole 29 of an apparatus 30 which supplies the relay and the jack with compressed fluid. The banjo sensor 31 is surmounted by a simple banjo 32. The direct supply circuit passes through 32 and the sensor 31 is supplied in by-pass.

In the embodiment of FIG. 5, the screw 28 is mounted on the distributor 8, and the body 31 presents a pipe 10 connected to the leakage nozzle 11 and a signal output pipe 14 connected to the input controlling the distributor 8 by duct 27.

The other body 32 connects the pressurized fluid input by a pipe 33 to the supply duct 26 of one of the chambers of jack 9.

In the embodiment of FIG. 6, the screw 28 is mounted on the body of the jack, the body 31 being connected by its pipe 10 to the leakage nozzle 11, and the control signal output pipe 14 to the distributor 8 by a duct 27. The other body 32 is connected by a duct 26 to the distributor 8.

FIG. 8 shows a union body in T form which is similar to that of FIG. 1, but in which the jets 2 and 3 of the vacuum pump are made directly in the body and said body 1 of the sensor is associated with a T-union 34 to ensure monitoring of the functioning of jack 9 (FIG. 8).

In FIG. 7, the outputs are instantaneous connections for tubes.

FIG. 9 shows an embodiment of a leakage nozzle 11 which is made in a plate 35 of an apparatus and which is connected by a duct 36 to the pipe 10 of the relay.

On plate 35 moves a member 37 connected to a control means and which is capable of obturating the orifice of the leakage nozzle 11 in accordance with a known process but in the invention associated to interrupt the leakage.

FIGS. 10, 10*a* show a leakage nozzle 11 which is obturated by a valve 37 subjected to the action of springs and comprising a ball 38 which cooperates with a mobile member 39 fast in particular with a jack rod in accordance with a known process, but in the invention associated therewith for the interruption of the leakage.

FIGS. 11, 11*a* shows a means for obturating the leakage nozzle which is integrated in the body of the sensor. In this case, the leakage nozzle 11 has its opening monitored by a valve 40 controlled by a lever 42 against the action of a spring 41, said lever 42 being articulated about an axis 43 on the body 1 of the sensor and bearing at its other end a roller 44, cooperating with a mobile member 45 in the form of a cam, in order to open and close the orifice of the nozzle 11.

FIGS. 12 and 12*a* show a sensor which is integrated at the end of the body 46 of any apparatus, said body 46 being located opposite an obturator member 47 which, on sliding on the latter, obturates the leakage nozzle 11.

FIG. 13 shows a distributor comprising a body 48 in which is slidably mounted a slide 49 and which comprises at its two ends sensors monitoring the displacement of the slide. In fact, the ducts 14 delivering a control signal during obturation of the leakage nozzles 11 open opposite the ends of the slide 49 in order to displace the latter to the right or to the left. The input orifices of the sensors are connected by ducts 50, 50*a* to the fluid input orifice in body 48 of the distributor. The obturation of the leakage circuit may be effected all along circuit 11. In particular, a "manual" control may be implanted on circuit 11 in addition to the leakage circuit. The manual control obturating the circuit (sic.). The pneumatic signal is transmitted by duct 14 to the distributor.

FIG. 14 shows a sensor mounted at one of the ends of the distributor as in FIG. 13, but the opening and closure of the leakage nozzle 11 are monitored by a valve 51 which is made of magnetic metal actuated in the sensor of closure by an electro-magnet 52 connected to an electrical circuit.

In FIG. 14 as in FIG. 15, a manual control of the signal may easily be obtained by stopping the leakage with the finger; the valve 51 may also be pushed on its seat for obturation of the leakage. The valve 51 may also be equipped with a push button to facilitate the manoeuvre with the finger. A protection of the leakage may also be provided to avoid untimely manual manoeuvres.

It may also be useful to dispose on the suction a protection against stopping the holes in the valve seat 13, with the fingers, which would procure an untimely suction of the distributor slides. A filtration of the air may also be necessary for cleanliness of the seat of the valve.

FIG. 15 shows a sensor of which the body 1 is capable of being connected to a fluid input duct by its threaded pipes 5, 5*a*. As in the preceding example, the leakage nozzle 11 is monitored by a valve 51 actuated in the sense of closure by an electro-magnet 52. The pneumatic signal leaves via pipe 14.

FIG. 16 shows a sensor of which the body 1 receives an enclosure 53 in which is disposed a contactor 54 of which the control member 55 is in abutment against a deformable diaphragm 56 obturating a chamber 57 in which opens out a duct 14 emitting a pressure signal upon obturation of the nozzle 11.

Consequently, there is produced a deformation of the diaphragm 56 which actuates the member 55 of the contactor 54 which emits an electrical signal corresponding to the pneumatic signal of the sensor.

FIGS. 15 and 16 constitute what is presently called electro-pneumatic interfaces, converting thanks to the invention the pneumatic signal into an electrical signal, and vice versa.

The invention finds its domain in the control of the cycles of pneumatic jacks, and in the pneumatic monitoring of the cycles of machines.

There are four possibilities of combining the apparatus with the device according to the invention:

1. The leakage circuit may either be integrated in the apparatus, or obturated by remote control.

2. The signal emitted by the sensor may either be integrated in the apparatus, or may remotely control a member.

The invention is, of course, non limiting and the man skilled in the art may make modifications thereto without departing from the domain of the invention.

We claim:

1. An improved pneumatic sensor for the control of pneumatic cycles including in combination a fluid jet vacuum pump having an inlet and an outlet and a pair of jets therebetween with a space between the jets, a source of compressed air, means connecting said source of compressed air to said inlet, a leakage nozzle, means connecting said nozzle to said outlet, obturation of said nozzle provoking a rise in pressure in said vacuum pump, said rise in pressure being used as a signal for controlling a pneumatic component, means forming an outlet orifice leading out of said space for emitting said control signal, a duct connected to said outlet orifice, and and valve means connected to said space and responsive to the increase in pressure in said outlet during obturation of said nozzle so that the supply pressure is established at the outlet orifice and the duct carries a pneumatic pressure signal and responsive to decrease in pressure in the outlet to admit air into the space during flow out of the leakage nozzle to prevent reduction of pressure by the vacuum pump.

2. An improved sensor including in combination a sensor body, means within said body forming two jets of a vacuum pump with a space between said jets, a first orifice in said body forming an inlet to said vacuum pump, a source of compressed air, means connecting said source of compressed air to said first orifice, a second orifice in said body forming an outlet for said vacuum pump, a leakage nozzle connected to said second orifice, a third orifice in said body leading into said space, an output duct connected to said third orifice for emitting a control signal, a fourth orifice in said body leading into said space, and valve means mounted in said fourth orifice and responsive to the increase in pressure in said outlet during obstruction of said leakage nozzle and responsive to decrease in pressure in the outlet to admit air into said space during flow out of the leakage nozzle.

3. An improved sensor as in claim 1 including an output amplifier of said control signal, said amplifier comprising a by-pass duct between said inlet and said outlet orifice and a valve comprising a member for obturating said by-pass duct.

4. An improved sensor as in claim 2 including an output amplifier of said control signal carried by said body, said output amplifier comprising a by-pass duct between said first orifice and said third orifice and a valve comprising a member for obturating said by-pass duct.

5. An improved sensor as in claim 2 in which said body is formed with a duct for compressed air, said duct having a pair of ends and a central part, said sensor including a distributor and a jack having a chamber, means connecting one end of said duct to said distributor, means connecting the other end of said duct to said jack chamber, and means connecting the central part of said duct to the jets of said vacuum pump.

6. An improved sensor as in claim 2 in which said body is constituted as a double banjo union comprising a pair of sub-bodies and a screw adapted to be fixed to user apparatus, said screw being connected to said compressed air source, one of said sub-bodies containing said vacuum pump and said airing valve and comprising said first and second and third orifices and said other sub-body being connected to an input and an output of compressed air for supplying another apparatus.

7. An improved sensor as in claim 1 including a control valve for regulating the opening of said leakage nozzle, a lever for operating said control valve, means mounting said lever for pivotal movement, a roller on said lever and a movable element for actuating said roller.

8. An improved sensor as in claim 2 including a control valve on said body for regulating the opening of said leakage nozzle, a lever for operating said control valve, means mounting said lever for pivotal movement on said body, a roller on said lever, and a movable member for actuating said roller.

9. An improved sensor as in claim 1 including a distributor comprising an elongated body and an internal slide, said first-named vacuum pump and leakage nozzle and airing valve being integrally arranged at one end of said elongated body, a second vacuum pump, a second leakage nozzle and a second airing valve integrally arranged at the other end of said elongated body, a duct in said elongated body connecting the inlets of said vacuum pumps to said compressed air source, said outlet orifices applying said control signals to the ends of said slide.

10. An improved sensor as in claim 2 including a distributor comprising an elongated distributor body and an internal slide, means arranging said first named sensor body integrally with one end of said distributor body with said third orifice communicating with the interior of said distributor body at one end of said slide, a second sensor body, means integrally arranging said second sensor body with the other end of said distributor body with the third orifice of the second body communicating with the interior of the distributor body at the other end of said slide, a duct in said distributor body connecting the first orifices of said sensor bodies to said source of compressed air, said third orifices applying said control signals to the ends of said slides.

11. Improvement in sensors according to any one of claims 1 to 10, characterized in that the obturation of the orifice of the leakage nozzle 11 is controlled by a valve 51, controlled by an electrical means 52, or pneumatic, or manual.

12. Improvement in sensors according to any one of claims 1 to 10, characterized in that the pneumatic control signal acts on a means 53, 55, 56 converting the pneumatic signal into an electrical signal.

* * * * *